United States Patent [19]

Kawata et al.

[11] Patent Number: 4,511,237

[45] Date of Patent: Apr. 16, 1985

[54] ELECTROPHOTOGRAPHIC REPRODUCING MACHINE

[75] Inventors: Shun Kawata, Tokyo; Isao Nosaka, Hachioji; Hiroshi Katakura, Fuchu, all of Japan

[73] Assignee: Konishiroku Photo Industry Co., Ltd., Tokyo, Japan

[21] Appl. No.: 479,820

[22] Filed: Mar. 28, 1983
(Under 37 CFR 1.47)

[30] Foreign Application Priority Data

| Apr. 8, 1982 | [JP] | Japan | 57-58523 |
| Apr. 8, 1982 | [JP] | Japan | 57-58524 |
| Apr. 8, 1982 | [JP] | Japan | 57-58525 |
| Apr. 8, 1982 | [JP] | Japan | 57-58526 |
| Apr. 8, 1982 | [JP] | Japan | 57-58527 |
| Apr. 8, 1982 | [JP] | Japan | 57-58528 |
| Apr. 8, 1982 | [JP] | Japan | 57-58529 |
| Apr. 8, 1982 | [JP] | Japan | 57-58530 |
| Apr. 8, 1982 | [JP] | Japan | 57-58531 |
| Apr. 8, 1982 | [JP] | Japan | 57-58532 |

[51] Int. Cl.³ .................................................. G03G 15/00
[52] U.S. Cl. ........................................ 355/3 R; 355/8
[58] Field of Search ................. 355/3 R, 3 DR, 8, 11, 355/133

[56] References Cited

U.S. PATENT DOCUMENTS 4,180,319 12/1979 Kaufmann et al. ................. 355/3 R
4,335,950 6/1982 Gunzelmann et al. .............. 355/3 R
4,432,633 2/1984 Nosaka et al. .......................... 355/8

Primary Examiner—Richard L. Moses
Attorney, Agent, or Firm—James E. Nilles

[57] ABSTRACT

An electrophotographic reproducing machine wherein an integrally formed dish-like housing for an exposure optical system is mounted onto a machine frame which accommodates therein a plurality of process units for reproducing and is opened upward, and a document glass plate is mounted at the top portion of the housing for the exposure optical system through glass mounting plates. The housing accommodates therein a slit plate for scanning of an exposure lamp, a projection lens, which is formed in its peripheral walls with vent holes for promoting ventilation within the machine and which has at its bottom portion a shield bottom wall serving as also a heat insulating plate. Guide rail surfaces for guiding movable mounts of the optical system are formed on both side walls of the housing opposite to each other. A projection lens mounting seat is integrally formed substantially at the center of the bottom wall of the housing, and a shield box raised upward from the bottom wall is integrally formed on the bottom wall at a position adjacent to the production lens mounting seat.

16 Claims, 10 Drawing Figures

ELECTROPHOTOGRAPHIC REPRODUCING MACHINE

BACKGROUND OF THE INVENTION

1. Field of the Invention

This invention relates to an electrophotographic reproducing machine.

2. Description of Prior Art

In conventional electrophotographic reproducing machines, a shield plate made of a metal plate is mounted at the upper portion of a machine frame which accommodates therein a photosensitive drum and a plurality of process units, so that the shield plate and the upper portion of the machine frame constitute a housing for an exposure optical system. A movable mount for the exposure optical system is fitted on guide rails fixed to the upper inner face of the machine frame, and a document glass plate is placed on the upper surface of the machine frame in a fixed manner.

In the conventional machine structure thus arranged, therefore, since various constituent members of the exposure optical system are mounted onto the machine frame as the central base, an assembling line for reproducing machines becomes very long and this leads to disadvantages such as an enlargement of facilities and a prolonged time limit of delivery.

Further, a light beam radiated from an exposure lamps leaks through a gap between metal plates, and this requires an additional working step adapted to prevent such leakage of the light beam. Heat within the housing for the exposure optical system is radiated to the peripheral surface of the photosensitive drum by the shield plate made of a metal plate, so that the photosensitive drum will deteriorate in an early time. At the same time, due to less air convection within the housing for the exposure optical system, temperature within the housing is increased, thus resulting in many problems.

Meanwhile, a housing for an exposure optical system in conventional electrophotographic reproducing machines is composed of a shield plate made of a metal plate fixed at the upper portion of a machine frame which accommodates therein a photosensitive drum and a plurality of process units, a lens mounting frame extending in the transverse direction of the machine frame, rails fixed to the inner side face of the machine frame for guiding a movable mount for the exposure optical system, and a black box fixed on the upper face of the shield plate to interrupt external lights. But according to thus structured housing for the exposure optical system, the manufacturing cost is increased due to large number of parts and adjustment as well as shield processing become intricate due to unavoidable errors in machining and assembling with many respective parts. With this, it is difficult to achieve reduction in the manufacturing cost as a result of mass production. Further, the housing for the exposure optical system is required to be assembled onto the machine frame which is running forward on the assembling line, so it is also difficult to conduct preassembling of the exposure optical system.

Meanwhile, in a movable mount for conventional electrophotographic reproducing machines, there has been used a current collector in slide-contact with an electrode plate as a stationary portion of the machine in order to feed an exposure lamp and other parts with current. The prior current collector includes a coil spring interposed between a current applying metal plate and a current collecting brush, thereby to effect the electrical coupling between both members. This results in several problems such as early fatigue of the coil spring due to its heating, occurrence of noise and failed conducting.

Moreover, when feeding electrical power to the movable mount mounting thereon the exposure lamp, the current collecting is usually effected in a system wherein an electrode line is laid along running rails for the movable mount through an insulative base plate, such that a current collecting brush provided on the movable mount is brought into slide-contact with the electrode line. However, the electrode line in the prior art is formed of a long and narrow printed board or the like and this printed board is fixed to the running rails for the movable mount, thus resulting in the intricate assembling process.

Meanwhile, a document glass plate for electrophotographic reproducing machines is required to be held precisely in parallel with respect to the optical axis of an exposure optical system. In the past, the document glass plate has been seated in an upper flange of a machine frame constituting a housing for the exposure optical system onto which are mounted constituent members of the exposure optical system, so that it is difficult to hold the aforesaid precise parallel relationship in terms of a limit in machining accuracy just by directly seating the document glass plate in the upper flange. From this reason, when mounting the document glass plate onto the machine frame, a spacer with an appropriate thickness is interposed heretofore between the upper flange and the document glass plate, thereby to attain the aforesaid parallel relationship. But such adjustment at the time of assembling requires highly experienced and intricate work and hence it is not suitable for mass production.

Furthermore, as well known, in an exposure optical system for electrophotographic reproducing machines, a lens plate is disposed within a shield box in the transverse direction and a mounting flange of a projection lens is screwed to the lens plate.

But there is a variation in the respective projection lenses manufactured and, particularly, resolving power of an image takes various values depending on directions within the image. Thus, the above-mentioned structure in which the projection lens is screwed to the lens plate using the mounting flange can not ensure that a portion of the projection lens having the highest resolving power is utilized for the belt-like image having passed through a slit.

Also, as well known, focus adjustment of the projection lens is carried out using a spacer with a desired thickness which is interposed between the projection lens and the lens plate. In such conventional focus adjustment structure, however, mounting screws have to be loosened every when inserting one of plural spacers different in thickness thereof, and this results in the intricate adjustment work. Further, since the mounting screws are fastened in the direction corresponding to the depthwise direction of the spacer, the projection lens is made to move along the optical axis of the projection lens during the fastening process, whereby such adjustment work requires highly experienced skill.

In addition, an exposure optical system for reproducing machines generally include a shield box for shielding a light beam having passed through the projection lens from external lights, and the shield box mounts therein a mirror adapted to reflect the incident light from the projection lens toward a photosensitive drum.

Heretofore, an all-metal frame has been usually employed, so it was not unavoidable, for example, that there occurs some error in a distance between the portion for mounting a barrel of the projection lens and the portion for mounting the reflection mirror, thus leading to a problem that a fairly large amount of time is required for adjustment of such error. This results from errors in dimensions of the metal frame and in mounting thereof, therefore the metal frame itself can not contribute to adjustment of errors. There has been also known a mounting structure for the reflection mirror such that the mounting surface of the shield box is finished to a mirror surface and then the mirror is seated on the mounting surface. But it is very difficult to precisely finish the mounting surface with respect to the optical axis of the projection lens as well as a relationship between the optical axis and the photosensitive drum. Therefore, a spacer or the like is interposed between the mounting surface and the mirror in the prior art, thereby to secure the satisfactorious accuracy in positional relationships, but this adjustment is an intricate work which requires special skills and much time.

Meanwhile, the shield box is constituted by metal plates disposed on a shield plate at the bottom portion of a housing for the exposure optical system. A top plate of the shield box is formed of a draw lid so as to allow a mirror mounted within the shield box to be cleaned.

However, such conventional structure has encountered a difficult in shielding between the shield box body and the draw lid completely. Penetration of stray lights from surroundings after regular assembling requires additional machining work to achieve complete shielding. Since the shield box must undergoes the plate work, the manufacturing cost is highly increased.

Further, as mentioned above, in conventional electrophotographic reproducing machines, a shield plate made of a metal plate is mounted at the upper portion of a machine frame which accommodates therein a photosensitive drum and a plurality of process units, so that the shield plate and the upper portion of the machine frame constitute a housing for an exposure optical system. A movable mount for the exposure optical system is fitted on guide rails fixed to the upper portion of the machine frame, and a document glass plate is placed on the upper surface of the machine frame in a fixed manner.

According to such machine structure, however, assembling and adjustment works become very intricate and hence the manufacturing cost is highly increased. In order to solve this problem, it may be advisable to adopt such a structure that the housing for the exposure optical system is resin-molded and thus obtained resin housing is mounted onto the machine frame. But this structure is accomplished with another problem how to coincide the optical axis of the machine frame with that of the housing for the exposure optical system.

SUMMARY OF THE INVENTION

It is an object of this invention to eliminate the above-mentioned problems such as too large length of the assembling line, early deterioration of the photosensitive drum and overheating within the housing for the exposure optical system which have been encountered in the conventional reproducing machines, and also to reduce the number of parts of the housing for the exposure optical system to a large extent. This invention is featured in that an integrally formed dish-like housing for the exposure optical system which accommodates therein a slit plate for scanning, an exposure lamp and a projection lens, which is formed in its peripheral walls with vent holes for promoting ventilation within the machine and which has at its bottom portion a shield bottom wall serving as also a heat insulating plate is mounted on the top portion of a machine frame which accommodates therein a plurality of process units for reproducing and is opened upward, and a document glass plate is mounted at the top portion of the housing for the exposure optical system through glass mounting plates.

Another object of this invention is, in view of the above-mentioned problems attendant on assembling of the conventional exposure optical system, to provide an integrally formed housing for the exposure optical system using resins, which permits the exposure optical system to be preassembled in a separate assembling line from that for the machine frame, which has the cheaper manufacturing cost as a result of the reduced number of parts, and which can realize mass production.

Still another object of this invention is, in view of the above-mentioned problems attendant on the current collecting structure for the conventional exposure optical system, to provide a current collector wherein a keyhole-like slot is formed at one side of a current applying metal plate to which is connected one end of a lead wire, a current collecting brush is fixed at the other end of the lead wire with a coil spring fitted therearound, the lead wire is passed through the keyhole-like slot with the coil spring in the compressed state, and the current applying metal plate is incorporated in an insulation block.

Still another object of this invention is to permits a movable mount to collect current through a glass supporting plate which is attached at the top of the housing for the optical exposure system, and more specifically to provide a current collecting structure such that the glass supporting plate is formed of an electrically insulative resin, an electrode plate is attached to the bottom surface of thus formed glass supporting plate, and power is fed to the movable mount through the electrode plate.

Still another object of this invention is to eliminate a need of intricate adjustment by such a construction that three posts with high positional accuracy are provided in the housing for the exposure optical system which incorporates therein respective constituent members of the exposure optical system, a glass supporting plate is mounted on these three posts in a three-point supporting manner, and a document glass plate is seated on the glass supporting plate.

Still another object of this invention is to make the direction of high resolving power of a lens for focusing a belt-like image in the construction wherein the lens for focusing the belt-like image having passed through a slit is mounted on the stationary portion of the machine, by boring threaded holes in mounting seats having a pair of receiving faces in a shape of V which receive the peripheral wall of a cylindrical lens rotatable about its optical axis, and the cylindrical lens is fixed in position with the aid of the threaded holes and a holding band.

Still another object of this invention is, in view of the above-mentioned problems attendant on the conventional focus adjustment operation, to provide such a construction that the peripheral wall of the cylindrical lens is seated on the paired receiving faces of the mounting seats which faces form a shape of V and extend in the direction of the optical axis, an adjusting spacer is interposed between the mounting face on the stationary portion of the machine and the end face of the cylindrical lens, and the cylindrical lens is fixed to the mounting seats using the holding band.

Still another object of this invention is, in view of the fact that the current resin forming technology can ensure dimensional accuracy in order of ±0.01 mm even for articles of fairly large size, to eliminate a need of adjustment at the time of mounting the mirror by such a construction that the housing which incorporates therein respective constituent members of the exposure optical system for reproducing machines is integrally formed using resins, a projection lens mounting portion and a mirror mounting portion are provided on a shield box formed integrally with the housing, three seat bosses are projected, and the mirror is placed on these seat bosses.

Still another object of this invention is to provide such a construction that the shield box opened downward is integrally formed using resins with the housing which incorporates therein respective constituent members of the exposure optical system for reproducing machines, and the bottom side of the shield box is covered with a drawable shield plate thereby to prevent contamination and diffused reflection within the shield box.

Still another object of this invention is to provide such a construction as ensuring the desired relationship in terms of optical axis just by mounting the resin-made housing for the exposure optical system onto the machine frame, and more specifically to provide a construction for positioning and fixing such housing in the reproducing machine which includes the housing for the exposure optical system mounted on the top portion of the machine frame, wherein the machine frame is formed with a positioning standard face in parallel to the optical axis of the projection lens which is accommodated in the housing for the exposure optical system, the positioning standard face on the machine frame is brought into abutment with the correponding face formed on the housing for the exposure optical system, thereby to attain the desired relationship between the machine frame and the housing for the exposure optical system and then both members are fixed to each other.

Other objects and features of this invention will be apparent from the following description with reference to the accompanying drawings.

DESCRIPTION OF THE PREFERRED EMBODIMENTS

Figure 1:
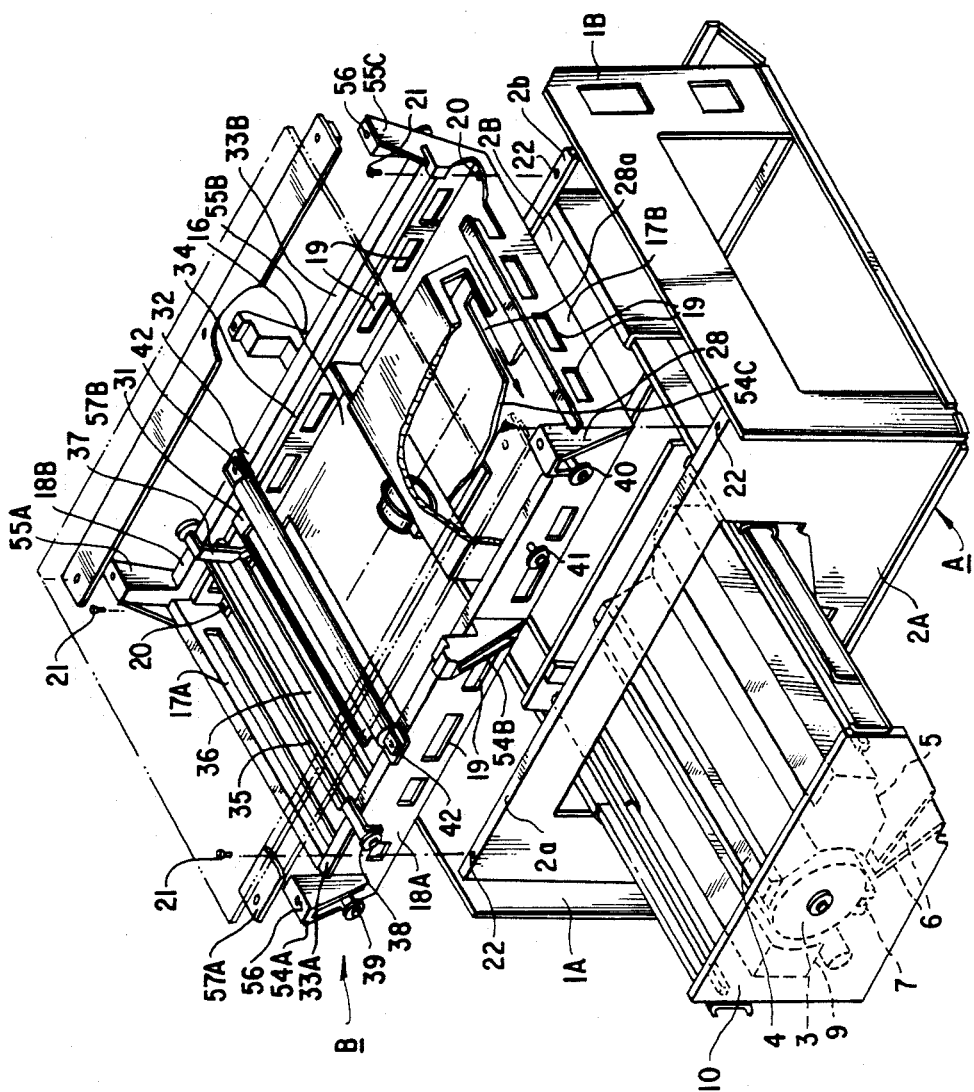
FIG. 1 is an exploded perspective view of an electrophotographic reproducing machine according to this invention.
Figure 2:
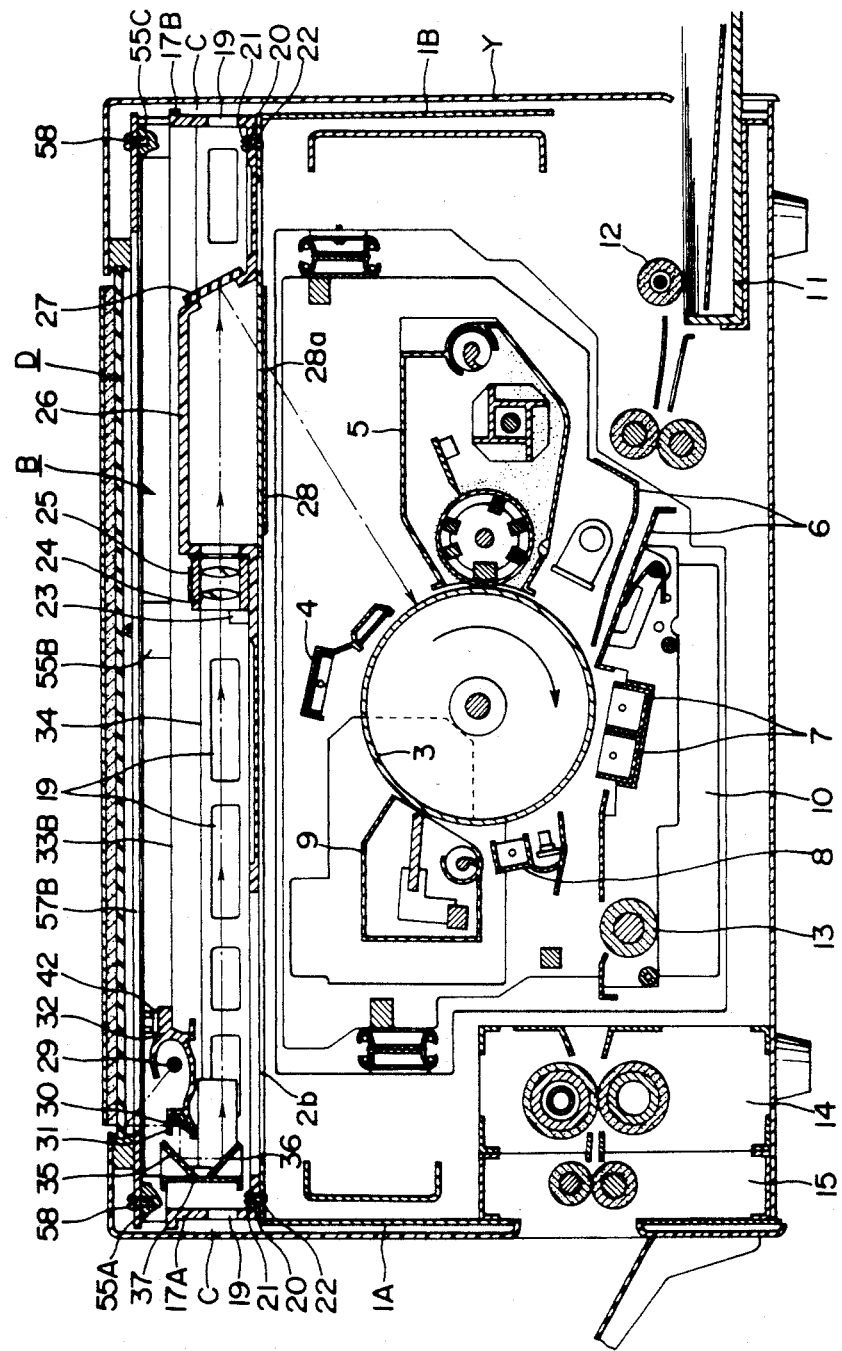
FIG. 2 is a longitudinal sectional view of the reproducing machine shown in FIG. 1 in the completely assembled state.

FIG. 1 is an exploded perspective view of an electrophotographic reproducing machine according to this invention, and FIG. 2 is a longitudinal sectional view of the electrophotographic reproducing machine in the completely assembled state.

A machine frame A of the electrophotographic reproducing machine has a box-like structure opened upward, which comprises a pair of end plates 1A and 1B opposite to each other and another pair of side plates 2A and 2B mounted to the end plates 1A and 1B.

As shown in FIG. 2, a photosensitive drum 3 by way of an image retaining member driven to rotate in the direction of an arrow is mounted at the center of the machine frame A. Around the photosensitive drum 3 there are disposed in the rotating direction of the drum a plurality of process units such as a charging electrode 4, a magnetic brush developing unit 5, transfer paper guide plates 6, a transfer paper separation electrode 7, a charge eliminating electrode 8, and a cleaning device 9 in due order. These process units are mounted onto a frame member 10 which is drawable from the machine frame A, as will be seen from FIG. 1. In FIG. 2 the reference numerals 11, 12, 13, 14 and 15 designate a paper feeding cassette, paper feeding roller, conveyance roller, fixing unit and a paper discharging roller unit, respectively.

The side plates 2A and 2B have upper flanges 2a and 2b which are bent at a right angle toward the inside of the machine frame A, respectively, and an exposure optical system housing B integrally formed into a dish-like shape using heat insulative resins is mounted on the upper flanges 2a and 2b. By way of example, the exposure optical system housing B is preferably formed in such a manner that a foaming resin of excessively small amount with respect to the capacity of a mold cavity is first injected into the cavity, then high-pressure gas is blown into the cavity so as to harden a surface resin within the mold cavity, and then the high-pressure gas is removed to allow foaming of the internal resin. With this forming method, it is possible to attain a housing which is light in weight, has a high level of thermal insulation and ensures precise dimensions without including any reduction during the cooling process.

The exposure optical system housing B comprises a bottom wall 16 having a substantially rectangular shape, a pair of end walls 17A, 17B and another pair of side walls 18A, 18B, two pairs of walls surrounding four sides of the bottom wall 16. A plurality of vent holes 19 are bored in those end walls 17A, 17B and side walls 18A, 18B, while mounting holes 20 are formed at four corners of the bottom wall 16. Mounting screws 21 are inserted through the mounting holes 20 in the bottom wall 16 and then screwed into threaded holes 22 formed in the upper flanges 2a, 2b, thereby to fix the exposure optical system housing B to the machine frame A. Therefore, in the assembled state of the exposure optical system housing B onto the machine frame A, the vent holes 19 are communicated with a space C between a machine housing Y and the machine frame A, as shown in FIG. 2, whereby there occurs convection or ventilation of air within the machine including the interior of the exposure optical system housing B so as to prevent overheating of the exposure optical system.

A projection lens mounting seat 23 is integrally formed at the center of the bottom wall 16 of the exposure optical system housing B, and a projection lens 24 is mounted on the projection lens mounting seat 23 using a band 25 in a shape of U. Moreover, a shield box 26 projecting upward is integrally formed at a portion near one end of the bottom wall 16, and a mirror 27 directing toward the peripheral surface of the photosensitive drum 3 is fixed at the end face of the shield box 26 on the side opposite to the projection lens 24. Further, the bottom side of the shield box 26 opened downward is covered with a small-sized shield plate 28 which is drawable and has a slit 28a.

Both side walls 18A, 18B of the exposure optical system housing B have their upper faces constituting guide rail surfaces 33A, 33B, respectively, on which are rested both end portions of a first movable mount 32 mounting thereon an exposure lamp 29, a mirror 30 and a slit plate 31. On the other hand, both end portions of a second movable mount 37 mounting thereon a pair of two mirrors 35 and 36 disposed to cross at a right angle are supported on and guided by guide rail surfaces 34 of both side walls 18A, 18B which are positioned below and inward the guide rail surfaces 33A, 33B.

It is a matter of course that a wire (not shown) is entrained among the end portion of the first movable mount 32, a loose pulley 38 at the end of the second movable mount 37, fixed pulleys 39, 40 at both ends of the side wall 18A or 18B, and a relay puller 41 at the intermediate portion of the side wall 18A or 18B on each side. With thus entrained wire, the first movable mount 32 is moved at a constant speed, while the second movable mount 37 is moved at a half speed of that of the first movable mount 32.

Figure 3:
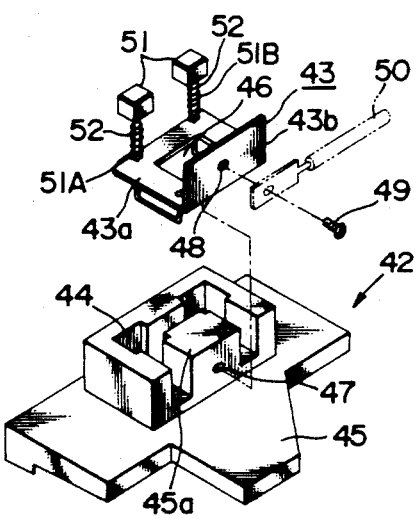
FIG. 3 is an exploded view of a current collector.

A pair of current collectors 42 as shown in FIG. 3 are fixed at both end portions of said first movable mount 32 for feeding current to the exposure lamp 29. More specifically, each of the current collectors 42 includes a resin-made insulation block 45 formed with an accommodation hole 44 which can receive a bottom plate portion 43a of a current applying metal plate 43, the plate 43 being bent into a shape of L. The insulation block 45 is integrally formed with a vertical block 45a into which can be fitted a rectangular opening 46 in the bottom plate portion 43a. The vertical block 45a is formed at its side face with a threaded hole 47 and a fixing screw 49 is screwed into the threaded hole 47 through an opening 48 formed in a side plate portion 43b of the current applying metal plate 43, so that the plate 43 is fixed to the insulation block 45 by means of the fixing screw 49. Further, a power supply cord 50 led from the exposure lamp 29 is connected to the side plate portion 43b of the current applying metal plate 43, and it is fixed to the current applying metal plate 43 by means of the fixing screw 49.

Figure 4:
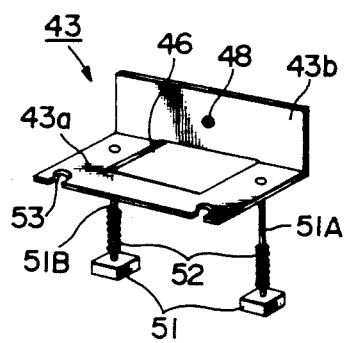
FIG. 4 is a view for explaining an assembling method of a current collecting brush.

Proximal portions of a pair of two lead wires or bars 51A, 51B including each a current collecting brush 51 fixed at its head portion are soldered to the current applying metal plate 43. More specifically, these lead bars 51A, 51B are assembled as follows. Proximal portions of both lead bars 51A, 51B are first soldered to the bottom plate portion 43a at two side positions near the side plate portion 43b with coil springs 52 being fitted around those bars, as illustrated in FIG. 4. Then, while compressing the coil springs 52, the lead bars 51A, 51B are bent into a shape as illustrated in FIG. 3 with the intermediate portions thereof being fitted into keyhole-like slots 53 formed in the bottom plate portion 43a at positions opposite to the side plate portion 43b.

It should be noted that each current collecting brush 51 has a tendency to move upward by virtue of a pressing force of the coil spring 52 in thus assembled state.

Figure 5:
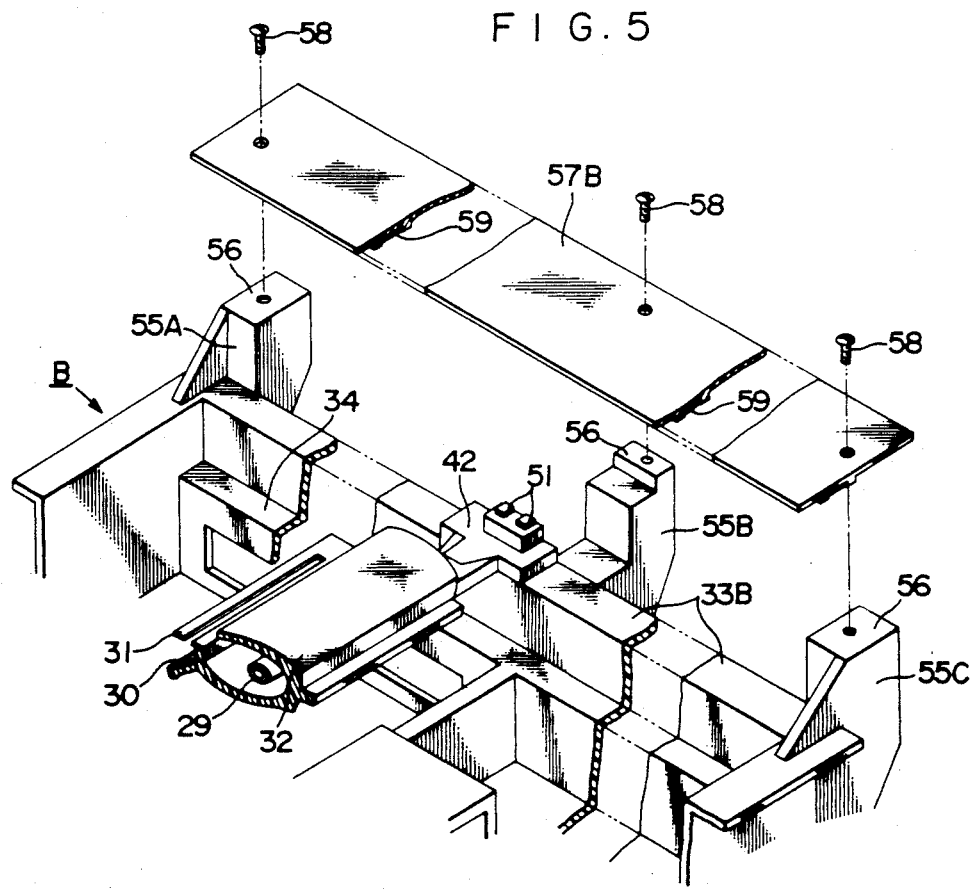
FIG. 5 is an exploded view showing the relationship between a housing for an exposure optical system and a glass plate supporting plate.

As will be seen from FIGS. 1 and 2, two pairs of three posts 54A, 54B, 54C and 55A, 55B, 55C projecting upward from the side walls 18A and 18B, respectively, are formed integrally with both end portions and the intermediate portions of two side walls 18A, 18B of the exposure optical system housing B. As illustrated in FIG. 5, the paired three posts 54A, 54B, 54C and 55A, 55B, 55C are disposed at positions biased in the widthwise direction of the exposure optical system housing B not to be aligned on a straight line in the horizontal plane, but to have respective top faces, i.e., seat faces 56, positioned on the same horizontal plane. Then, a pair of glass mounting plates 57A and 57B are fixed on the paired three posts 54A, 54B, 54C and 55A, 55B, 55C by means of mounting screws 58, respectively, so as to be positioned above the current collectors 42. Each of the glass mounting plates 57A and 57B is formed into a long and narrow flat plate using an electrically insulative resin. As will be seen from FIG. 5 with parts being broken away, the glass mounting plate includes at its bottom surface a buried flat electrode plate 59 with which each current brush 51 comes into slide-contact, so that power is fed to the exposure lamp 29 through the electrode plate 59. Besides, a document glass plate D is placed and fixed between the pair of glass mounting plates 57A and 57B so as to cover the exposure optical system housing B from above.

Since the electrophotographic reproducing machine according to this embodiment is thus constructed, the exposure optical system can be built up in a separate assembling line from that used for the machine frame A which incorporates therein the various process units. More specifically, it becomes possible that the projection lens 24 and the mirror 27 are first mounted onto the exposure optical system housing B, the previously completed first and second movable mounts 32, 37 are arranged in straddling relation on the guide rail surfaces 33A, 33B and 34, and then the exposure optical system housing B is fixed to the machine frame A by means of the mounting screws 21. Thus this invention ensures many advantages as follows. The assembling line can be reduced in its length to a large extent comparing to the prior art. The bottom wall 16 of the exposure optical system housing B is formed of a heat insulating material, so that the photosensitive drum 3 may not be deteriorated too early due to thermal radiation from the bottom wall 16. Further, since the exposure optical system housing B mounted on the machine frame A are formed with the vent holes 19, air within the machine is well ventilated through the interior of the housing and hence the exposure optical system can be prevented from overheating.

Consequently, according to this invention, it becomes possible to shorten a length of the assembling line and to prevent early deterioration of the photosensitive drum as well as overheating of the exposure optical system by using the cheaper housing therefor.

Moreover, the exposure optical system housing B of this invention has the above-mentioned construction and it is integrally formed including the guide rail surfaces 33A, 33B and 34 for guiding the first and second movable mounts 32, 37, the mounting seat 23 for the projection lens 24, and the shield box 26 for shielding an optical path of the projection lens 24 on the downstream side from the exterior. Thus, the manufacturing cost of the exposure optical system can be lowered to a large extent comparing to the prior art. And use of the exposure optical system housing B of this invention makes it possible to assemble the exposure optical system in a separate assembling line from that used for the machine frame A. Since the mold adapted to form the exposure optical system housing B renders smaller cost for each product as the scale of mass production will be increased, an effect of mass production can be expected sufficiently.

Further, in the current collector of this invention, the current collecting brushes 51 are connected to the current applying metal plate 43 through the lead bars 51A and 51B, whereby the coil springs 52 will not be fatigued by heating and the state of electrical connection is also stable, thus causing no noise. Thus, there occurs so discharge between the coil spring 52 and the current collecting brush 51 and hence it is possible to prevent generation of an erroneous signal which otherwise will be sent to the control unit. This invention can provide such an additional advantage that the current collector can be simply assembled just by mounting the current collecting brushes 51 onto the current applying metal plate 43 and then by incorporating it into the insulation block 45.

Also, since the electrode plate 59 is buried in each of the glass supporting plates 57A and 57B which are formed of an electrically insulative resin, the current collecting structure can be completed just by mounting the glass supporting plates 57A and 57B on the exposure optical system housing B. And it becomes possible to attain a good insulative, safety current collecting structure which further permits the reduced number of parts and a remarkable reduction in the number of assembling steps.

In addition, according to this invention, the paired three posts 54A, 54B, 54C and 55A, 55B, 55C have the seat faces 56 in parallel to the optical axis of the optical system and each three posts are disposed not to be aligned on a straight line in the horizontal plane, so that the glass mounting plates 57A and 57B may be mounted into the stable state in parallel to the optical axis without failure. Therefore, it is possible to completely eliminate a need of adjusting parallelism for the document glass plate D which is mounted on the glass mounting plates 57A and 57B.

Figure 6:
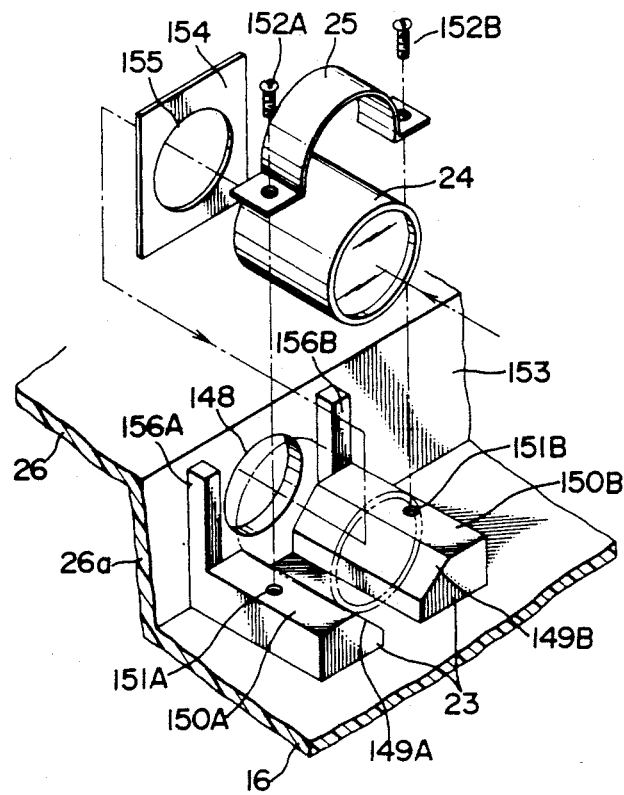
FIG. 6 is an exploded perspective view of a lens mounting portion.
Figure 7:
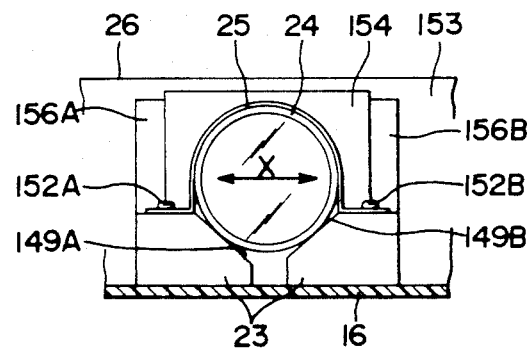
FIG. 7 is a front view of the lens mounting portion in the assembled state.

FIGS. 6 and 7 show a lens mounting structure according to this invention in detail. A through hole 148 of a relatively large diameter is bored at the center of a front wall 26a of the aforesaid shield box 26, while the projection lens mounting seat 23 in number two is integrally formed on the bottom wall 16 on the upstream side of the through hole 148. The projection lens mounting seats 23 extend in the direction parallel to the central axis of the through hole 148 and have a pair of receiving faces 149A and 149B opposite to each other forming a shape of V in the plane at a right angle with respect to the central axis of the through hole 148. Threaded holes 151A and 151B are bored in seat faces 150A and 150B outside of the receiving faces 149A and 149B, respectively. Then, fixing screws 152A and 152B are respectively screwed into the threaded holes 151A and 151B through openings which are formed in both end portions of the holding band 25 having a semicircular shape.

Moreover, the projection lens 24 used in this invention is formed into a cylindrical shape as shown in FIG. 7, and it has high resolving power in the direction indicated by an arrow X. When mounting the projection lens 24 onto the projection lens mounting seats 23, a rectangular spacer 154 of a desired thickness is interposed between a vertical surface 153 of the front wall 26a and the end face of the projection lens 24. More specifically, the spacer 154 is formed at its central portion with an opening 155 corresponding to the through hole 148. A plurality of spacers different in thickness are prepared and there is used one of them which has a thickness corresponding to a gap between the vertical surface 153 and the end face of the projection lens 24 seated on the receiving faces 149A and 149B. For the purpose of guiding and holding the spacer 154, a pair of guide walls 156A and 156B are integrally formed on the surface of the front wall 26a with a space therebetween corresponding to a width of the spacer 154.

Since the lens mounting structure according to this invention has the above-mentioned construction, the center of the projection lens 24 can be made coincident with the optical axis of the exposure optical system precisely just by placing the projection lens 24 on the receiving faces 149A and 149B of the projection lens mounting seats 23. In this state where the projection lens 24 is placed on the receiving faces 149A and 149B, the lens 24 is turned until the high resolving power direction X of the projection lens 24 becomes horizontal, that is, comes in parallel to a slit formed in the slit plate 31. Thereafter, the projection lens 24 is fixed to the projection lens mounting seats 23 using the holding band 25. With this, the projection lens 24 ensures the best image within a range attainable with use of it.

Consequently, there can be obtained many advantages according to this invention as follows. The optical axis can be adjusted automatically just by placing the lens on the receiving faces. Lenses with individual characteristics different from one another can be employed in the state such that the highest resolving power is attained for the respective lenses. Assembling operation can be also facilitated remarkably.

Moreover, since the focus adjusting structure according to this invention has the above-mentioned construction, the center of the projection lens 24 can be made precisely coincident with the optical axis of the exposure optical system just by placing the projection lens 24 on the receiving faces 149A and 149B, as previously noted. And focus adjusting operation is carried out as follows. While observing the focused state, the projection lens 24 is made to move along the optical axis on the receiving faces 149A and 149B, thereby to determine the preferred position of the projection lens 24. Thereafter, the spacer 154 of a predetermined thickness is interposed between the projection lens 24 and the front wall 26a, and then the projection lens 24 is fixed onto the projection lens mounting seats 23 using the holding band 25. At this time, a tightening force caused by the fixing screws 152A and 152B acts in the direction at a right angle with respect to the central axis of the projection lens 24 and further the projection lens 24 is supported by the rigid projection lens mounting seats 23, so that it is possible to avoid a shift of the focusing position which has been once adjusted even at the time of tightening. Also, since the projection lens 24 is rigidly fixed by the holding band 25, the fixed state of the projection lens 24 will never be loosened after that.

Consequently, this invention can provide such a focus adjusting structure that adjusting operation is very simple, there is no fear of a shift in the focusing position at the time of fixing the lens, and the lens can be fixed positively.

Figure 8:
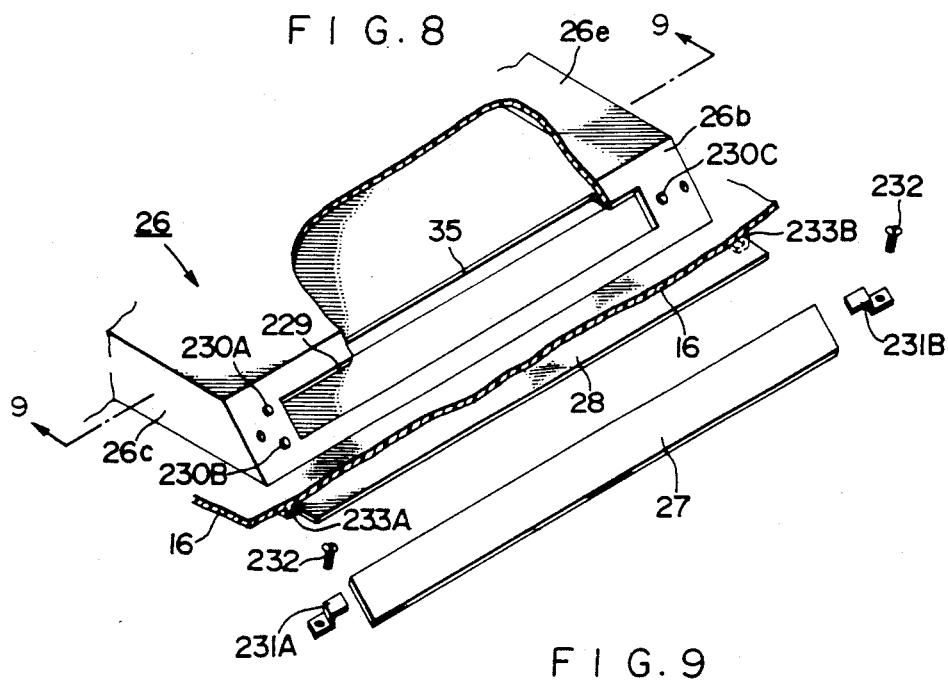
FIG. 8 is an exploded perspective view of a mirror mounting portion.
Figure 9:
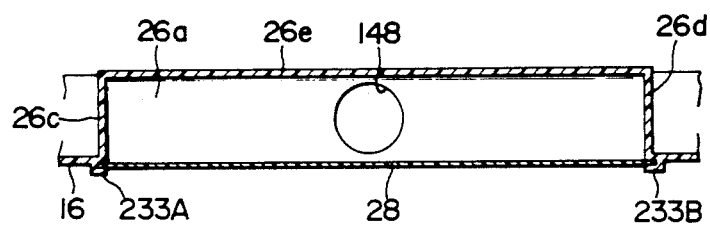
FIG. 9 is a sectional view taken along the lines of 9—9 in FIG. 8.

This invention is also featured in the shield box 26 which is opened downward and which comprises, as illustrated in FIGS. 8 and 9, the front wall 26a, a rear wall 26b and a pair of side walls 26c, 26d opposite to each other, these walls being raised upward from the bottom wall 16 to form a frame member. The upper side of the frame member is covered with a top wall 26e. The front wall 26a is formed at its center with the through hole 148 for introducing a light beam from the projection lens 24, as previously noted, while the inclined rear wall 26b opposite to the through hole 148 is formed with an elongated rectangular opening 229 which extends in the widthwise direction and allows the reflection surface of the mirror 27 to be exposed to the interior of the shield box 26.

On the other hand, three bosses 230A, 230B and 230C are integrally formed on the outer surface of the rear wall 26b, onto which is mounted the mirror 27, at both side portions in the widthwise direction of the rectangular opening 229. The mirror 27 is first seated on the distal ends of these bosses 230A, 230B and 230C and then fixed onto the rear wall 26b with the aid of locking fixtures 231A, 231B and fixing screws 232. A pair of guide pawls 233A and 233B are integrally formed on the lower surface of the bottom wall 16 at positions just below the side walls 26c and 26d of the shield box 26, respectively. A shield plate 28 to cover the lower side of the shield box 26 is supported between both guide pawls 233A and 233B in a drawable manner. The shield plate 28 has the slit 28a which allows the reflected light beam from the mirror 27 to pass therethrough, so that the light beam from the projection lens 24 is focused on the peripheral surface of the photosensitive drum through the mirror 27 and the slit 28a.

According to this invention, as described in the above, with the projection lens mounting seats 23 and the rear wall 26b serving as the mirror mounting surface being formed precisely, the projection lens and the mirror can be mounted and fixed without a need of adjustment substantially. More specifically, since three seating bosses 230A, 230B and 230C are projected on the mirror mounting surface of the shield box 26 which is precisely formed within the exposure optical system housing B made of resins and then the mirror 27 is seated on those bosses 230A, 230B and 230C, the mirror 27 can be mounted with no adjustment if those seating bosses 230A, 230B and 230C are precisely formed at proper positions with respect to the optical axis. Further, it is enough in this invention that the shield box 26 and the seating bosses 230A, 230B and 230C are formed integrally with the exposure optical system housing B made of resins. Thus, it becomes possible to attain the cheaper structure as a result of mass production.

In addition, according to the exposure optical system housing B of this invention, the shield box 26 is integrally formed on the bottom wall 16, so that an optical path of the projection lens 24 on the downstream side can be completely shielded from external lights. Because of the presence of the shield plate 28, the diffused light within the shield box 26 can be prevented from reaching the photosensitive drum 3. The shield plate 28 also serves to prevent floating toners within the machine from entering into the shield box 26. Further, when the surface of the projection lens 24 facing the interior of the shield box 26 and the inner surface of the mirror 27 are contaminated, this contamination can be removed easily by drawing out the shield plate 28 from the shield box 26. Thus, maintenance work is also facilitated remarkably.

Figure 10:
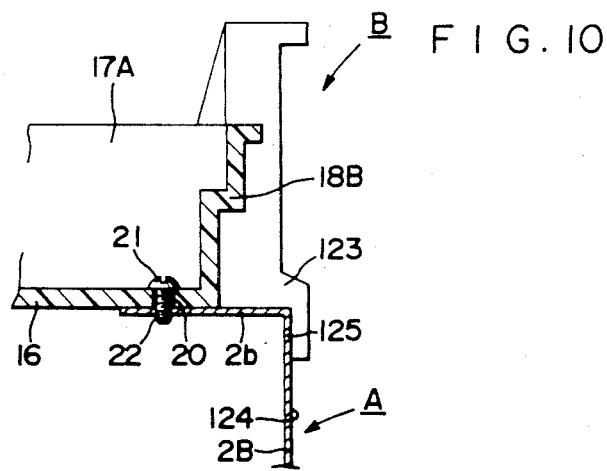
FIG. 10 is an explanatory view showing a positioning portion for the housing.

FIG. 10 illustrates a positioning structure used when fixing the exposure optical system housing B onto the machine frame A, which structure embodies still another feature of this invention. Positioning hooks 123 each having a shape of L and projecting sideward are integrally formed at both end portions of the side wall 18B of the exposure optical system housing B. To allow adjustment of a position of the exposure optical system housing B with respect to the machine frame A, the aforesaid mounting holes 20 is made much larger than an outer diameter of the mounting screws 21 and the outer surface of the side plate 2B constituting the machine frame A is made to serve as a positioning standard face 124 in parallel to the optical axis of the projection lens. Thus, there can be obtained the desired relationship between the machine frame A and the exposure optical system housing B just by fitting a vertical surface 125 of each positioning hook 123 to the positioning standard face 124 and then by tightening the mounting screws 21 into threaded holes 22 formed in the upper flanges 2a and 2b.

Since the structure for positioning and fixing the exposure optical system housing according to this invention is constructed as mentioned above, the optical axis of the projection lens 24 can be made precisely parallel to the axis of the photosensitive drum 3 by bringing the vertical surface 125 of each positioning hook 123 for the exposure optical system housing B into close contact with the positioning standard face 124 of the machine frame A. Therefore, the exposure optical system housing B can be assembled onto the machine frame A without a need of adjustment by tightening the mounting screws 21 after that, while holding such close contact state. As a result, it becomes possible to constitute the machine using the resin-made exposure optical system housing B which has the lower manufacturing cost and permits facilitation of the assembling work. It should be noted that although this invention has been described referring to the resin-made housing by way of an example, the above-mentioned structure is also applicable to the housing made of metals.

What is claimed is:

1. An electrophotographic reproducing machine wherein an integrally formed dish-like housing for an exposure optical system which accommodates therein a slit plate for scanning of an exposure lamp, a projection lens, which is formed in its peripheral walls with vent holes for promoting ventilation within said machine and which has at its bottom portion a shield bottom wall serving as also a heat insulating plate is mounted onto a machine frame which accommodates therein a plurality of process units for reproducing and is opened upward, and a document glass plate is mounted at the top portion of said housing for the exposure optical system through glass mounting plates.

2. An electrophotographic reproducing machine according to claim 1, wherein said housing for the exposure optical system is formed into a dish-like shape with heat insulating resins, guide rail surfaces for guiding movable mounts of the optical system are formed on both side walls of the housing opposite to each other, a projection lens mounting seat is integrally formed substantially at the center of a bottom wall of said housing, and a shield box raised upward from said bottom wall is integrally formed on said bottom wall at a position adjacent to said projection lens mounting seat.

3. An electrophotographic reproducing machine according to claim 1, wherein said housing is of box-like shape.

4. An electrophotographic reproducing machine according to claim 1, wherein a shield box which is opened downward and shields a light beam having passed through a projection lens from external lights is formed integrally with said housing for the exposure optical system, and the bottom side of said shield box is covered with a drawable shield plate, so that said shield plate may be drawn out from said shield box to allow the reflection surface to be exposed to the exterior at the time of cleaning a mirror fixed onto said shield box.

5. An electrophotographic reproducing machine according to claim 1, which further includes a positioning and fixing structure of said housing for the exposure optical system such that said machine frame is formed with a positioning standard face in parallel to the optical axis of said projection lens which is accommodated in said housing for the exposure optical system, said positioning standard face on said machine frame is brought into abutment with the corresponding face formed on said housing for the exposure optical system thereby to attain the desired relationship between said machine frame and said housing for the exposure optical system, and then both said members are fixed to each other.

6. An electrophotographic reproducing machine according to claim 1, wherein three posts are provided at the upper portion of said housing for the exposure optical system, top faces of said posts are made to form a seating plane constituting a horizontal plane on which said top faces are positioned not to be aligned on a straight line, and each of said glass mounting plates is placed on and fixed to said seating plane.

7. An electrophotographic reproducing machine according to claim 1, which further includes a lens mounting structure such that threaded holes are bored in mounting seats having a pair of receiving faces in a shape of V which receive the peripheral wall of a cylindrical lens rotatable about its optical axis, and said cylindrical lens is fixed in position with the aid of said threaded holes and a holding band.

8. An electrophotographic reproducing machine according to claim 1, wherein said housing includes a shield box for shielding a light beam having passed through said projection lens in the exposure optical system from external lights.

9. An electrophotographic reproducing machine according to claim 8, wherein a mirror for reflecting the light beam toward an image retaining member is fixed onto said shield box.

10. An electrophotographic reproducing machine according to claim 9, wherein said image retaining member is a photosensitive drum.

11. An electrophotographic reproducing machine according to claim 1, wherein said projection lens is of cylindrical form and the peripheral wall thereof is seated on a pair of receiving faces of mounting seats which faces form a shape of V and extend in the direction of the optical axis.

12. An electrophotographic reproducing machine according to claim 11, which further includes an optical system adjusting structure such that an adjusting spacer is interposed between the mounting face on the stationary portion of said machine and the end face of said cylindrical lens, and said cylindrical lens is fixed onto said mounting seats using a holding band.

13. An electrophotographic reproducing machine according to claim 1, wherein said exposure lamp is arranged in said housing.

14. An electrophotographic reproducing machine according to claim 1, wherein glass supporting plates formed of electrically insulative resins are provided on both said portions of said housing for the exposure optical system which accommodates therein the exposure lamp, the slit plate for scanning and the projection lens, an electrode plate is attached to the bottom surface of each of said glass supporting plates, and current collecting means of movable mounts positioned just below said glass supporting plate are brought into slide contact with said electrode plate.

15. An electrophotographic reproducing machine according to claim 13, wherein said current collecting means is formed such that a keyhole-like slot is formed at one side of a current applying metal plate to which is connected one end of a lead wire, a current collecting brush is fixed at the other end of said lead wire with a coil spring fitted therearound, said lead wire is passed through said keyhole-like slot with said coil spring in the compressed state, and said current applying metal plate is incorporated in an insulation block.

16. An electrophotographic reproducing machine according to claim 8, wherein said projection lens is of cylindrical form and the peripheral wall thereof is seated on a pair of receiving faces of mounting seats which faces form a shape of V and extend in the direction of the optical axis.

* * * * *